US011876833B2

(12) United States Patent
Lyle (10) Patent No.: US 11,876,833 B2
(45) Date of Patent: Jan. 16, 2024

(54) SOFTWARE DEFINED NETWORKING MOVING TARGET DEFENSE HONEYPOT

(71) Applicant: UCHICAGO ARGONNE, LLC, Chicago, IL (US)

(72) Inventor: Joshua A Lyle, Chicago, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 1013 days.

(21) Appl. No.: 16/542,201

(22) Filed: Aug. 15, 2019

(65) Prior Publication Data

US 2021/0051175 A1 Feb. 18, 2021

(51) Int. Cl.
| | | |
|---|---|---|
| G06F 15/16 | (2006.01) | |
| H04L 9/40 | (2022.01) | |
| H04L 45/00 | (2022.01) | |
| H04L 45/64 | (2022.01) | |
| H04L 49/354 | (2022.01) | |
| H04L 47/2441 | (2022.01) | |
| H04L 101/622 | (2022.01) | |

(52) U.S. Cl.
CPC ........ H04L 63/1491 (2013.01); H04L 45/38 (2013.01); H04L 45/64 (2013.01); H04L 47/2441 (2013.01); H04L 49/354 (2013.01); H04L 63/166 (2013.01); H04L 2101/622 (2022.05)

(58) Field of Classification Search
CPC .................. H04L 63/1491; H04L 63/1416
See application file for complete search history.

(56) References Cited

U.S. PATENT DOCUMENTS

| 7,697,420 B1 | 4/2010 | Garahi et al. |
| 7,831,897 B2 | 11/2010 | Heinebrodt et al. |
| 9,294,504 B1 | 3/2016 | Evans et al. |
| 9,654,395 B2 | 5/2017 | Park et al. |
| 10,084,756 B2 | 9/2018 | Tatlicioglu et al. |

(Continued)

OTHER PUBLICATIONS

"National Cyber Leap Year Summit 2009: Co-Chairs' Report," The Networking and Information Technology Research and Development Program, 58 pages (2009).

(Continued)

*Primary Examiner* — Hieu T Hoang
(74) *Attorney, Agent, or Firm* — Foley & Lardner LLP (57) ABSTRACT

Disclosed herein are systems, methods, and storage media for thwarting cyber-attacks and data theft. A computing system receives packets and compares with a configuration resource. The computing system determines that the packet does not match the configuration resource and transmits a packet to a decoy environment via an SDN switch. The decoy environment is configured to generate time-out, service unavailable, or restricted access messages. In some embodiments, the computing system determines the packet does match the configuration and transmits the packet to a production network via an SDN switch. The SDN switch is communicatively connected to the decoy environment through a first channel and communicatively connected to a production environment through a separate second channel. The computing system is further configured to create and transmit to the SDN switch, rules to manage transmitting the packet to either the decoy environment or the production environment.

17 Claims, 3 Drawing Sheets

(56) References Cited

U.S. PATENT DOCUMENTS

| | | | |
|---|---|---|---|
| 10,148,573 | B2 | 12/2018 | Zhang et al. |
| 2002/0120874 | A1 | 8/2002 | Shu et al. |
| 2004/0025018 | A1 | 2/2004 | Haas et al. |
| 2011/0142156 | A1 | 6/2011 | Haartsen |
| 2014/0289867 | A1 | 9/2014 | Bukai |
| 2014/0317684 | A1 | 10/2014 | Porras et al. |
| 2016/0065612 | A1 | 3/2016 | Evans et al. |
| 2016/0080415 | A1* | 3/2016 | Wu ............... H04L 63/1491 726/23 |
| 2017/0005943 | A1 | 1/2017 | Raj |
| 2017/0099305 | A1* | 4/2017 | Schwartz ............ H04L 63/20 |
| 2017/0230336 | A1* | 8/2017 | Bingham ........... H04L 63/1491 |
| 2018/0097784 | A1 | 4/2018 | Evans et al. |
| 2018/0115470 | A1 | 4/2018 | Huang et al. |
| 2018/0115523 | A1* | 4/2018 | Subbarayan ........... G06N 20/00 |
| 2020/0076850 | A1* | 3/2020 | Edgar ............... H04L 63/1491 |
| 2020/0177629 | A1* | 6/2020 | Hooda ............... H04L 47/125 |
| 2021/0360020 | A1* | 11/2021 | Wang ................ H04L 61/5007 |

OTHER PUBLICATIONS

Albrechtsen, "A qualitative study of users' view on information security," Computers & Security 26(4), pp. 276-289 (2007).
Al-Shaer, "Toward Network Configuration Randomization for Moving Target Defense," Advances in Information Security 54, Moving Target Defense, pp. 153-159 (2011).
Al-Shaer, et al., "Random Host Mutation for Moving Target Defense," Lecture Notes of the Institute for Computer Sciences, Social Informatics and Telecommunications Engineering 106, Security and Privacy in Communication Networks: SecureComm 2012, 18 pages (2013).
Arbor Networks, "The Growing Threat of Application-Layer DDoS Attacks," 20 pages (2012).
Azab & Eltoweissy, "CyberX: A biologically-inspired platform for cyber trust management," Collaborative Computing: Networking, Applications and Worksharing (CollaborateCom), pp. 655-663 (2012).
Azab, et al., "ChameleonSoft: A Moving Target Defense System," 7th International Conference on Collaborative Computing: Networking, Applications and Worksharing, pp. 241-250 (2011).
Beraud, et al., "Using cyber maneuver to improve network resiliency," Military Communications Conference, pp. 1121-1126 (2011).
Boyd & Keromytis, "SQLrand: Preventing SQL Injection Attacks," ACNS: International Conference on Applied Cryptography and Network Security, pp. 292-302 (2004).
Christodorescu, et al., "End-to-End Software Diversification of Internet Services," Advances in Information Security 54, Moving Target Defense, pp. 117-130 (2011).
Colbaugh & Glass, "Predictability-oriented defense against adaptive adversaries," IEEE International Conference on Systems, Man, and Cybernetics, pp. 2721-2727 (2012).
Colbaugh & Glass, "Proactive defense for evolving cyber threats," Intelligence and Security Informatics, Proceedings of 2011 IEEE International Conference on Intelligence and Security Informatics, 6 pages (2011).
Cox, et al., "N-variant systems: a secretless framework for security through diversity: Defense Technical Information Center," USENIX Association, Security '06: 15th USENIX Security Symposium, pp. 105-120 (2006).
Cui & Stolfo, "Symbiotes and defensive Mutualism: Moving Target Defense," Advances in Information Security 54, Moving Target Defense, pp. 99-108 (2011).
Dsouza, et al., "Resilient Dynamic Data Driven Application Systems (rDDDAS)," Procedia Computer Science 18, pp. 1929-1938 (2013).
Dunlop, et al., "MT6D: A Moving Target IPv6 Defense," Military Communications Conference, pp. 1321-1326 (2011).
Evans, et al., "Effectiveness of moving target defenses," Advances in Information Security 54, Moving Target Defense, pp. 29-48 (2011).

Fan & Fernandez, "A novel SDN based stealthy TCP connection handover mechanism for hybrid honeypot systems," 2017 IEEE Conference on Network Softwarization (NetSoft), 9 pages (2017).
Furnell, "Why users cannot use security," Computers & Security 24(4), pp. 274-279.
Groat, et al., "Using an IPV6 moving target defense to protect the Smart Grid. Innovative Smart Grid Technologies," IEEE PES Innovative Smart Grid Technologies, 7 pages (2012).
Groat, et al., "Using dynamic addressing for a moving target defense," Proceedings of the 6th International Conference on Information Warfare and Security, pp. 84-91 (2011).
Haas, et al., "Machine-oriented biometrics and cocooning for dynamic network defense," Proceedings of the Eighth Annual Cyber Security and Information Intelligence Research Workshop, art. No. 33, 4 pages (2013).
Huang & Ghosh, "Introducing Diversity and Uncertainty to Create Moving Attack Surfaces for Web Services," Advances in Information Security 54, Moving Target Defense, pp. 131-151 (2011).
Jackson, et al., "Compiler-Generated Software Diversity," Advances in Information Security 54, Moving Target Defense, pp. 77-98 (2011).
Jackson, et al., "Diversifying the Software Stack Using Randomized NOP Insertion," Advances in Information Security 100, Moving Target Defense II, pp. 151-173 (2012).
KC, et al., "Countering code-injection attacks with instruction-set randomization," Proceedings of the 10th ACM conference on Computer and communications security, pp. 272-280 (2003).
Kewley, et al., "Dynamic approaches to thwart adversary intelligence gathering," Proceedings of the DARPA Information Survivability Conference & Exposition II, 10 pages (2001).
Le Goues, et al., "Moving Target Defenses in the Helix Self-Regenerative Architecture," Advances in Information Security 100, Moving Target Defense II, pp. 117-149 (2012).
Lotia, "SDN-Intrusion-Prevention-System-Honeypot," retrieved from https://github.com/pratiklotia/SDN-Intrusion-Prevention-System-Honeypot, 16 pages (2017).
Lyon, "Nmap Network Scanning: The Official Nmap Project Guide to Network Discovery and Security Scanning," Insecure.Com LLC, 434 pages (2008).
Nguyen-Tuong, et al., "On the effectiveness of the metamorphic shield," Proceedings of the Fourth European Conference on Software Architecture: Companion vol. pp. 170-174 (2010).
Nguyen-Tuong, et al., "Security through redundant data diversity," IEEE International Conference on Dependable Systems and Networks With FTCS and DCC, pp. 187-196 (2008).
Phatak, "Spread-Identity mechanisms for DOS resilience and Security," First International Conference on Security and Privacy for Emerging Areas in Communications Networks, 12 pages (2005).
Phatak, et al., "Spread Identity: A new dynamic address remapping mechanism for anonymity and DDoS defense," Journal of Computer Security 21(2), pp. 233-281 (2013).
Portokalidis & Keromytis, "Global ISR: Toward a Comprehensive Defense Against Unauthorized Code Execution," Advances in Information Security 54, Moving Target Defense, pp. 49-76 (2011).
Rinard, "Manipulating Program Functionality to Eliminate Security Vulnerabilities," Advances in Information Security 54, Moving Target Defense, pp. 109-115 (2011).
Roeder & Schneider, "Proactive obfuscation," ACM Transactions on Computer Systems 28(2), art. No. 4, 54 pages (2010).
Scandariato & Knight, "The design and evaluation of a defense system for Internet worms," Proceedings of the 23rd IEEE International Symposium on Reliable Distributed Systems, pp. 164-173 (2004).
Shi, et al., "Full Service Hopping for Proactive Cyber-Defense," IEEE International Conference on Networking, Sensing and Control, pp. 1337-1342 (2008).
Shi, et al., "Port and Address Hopping for Active Cyber-Defense," PAISI: Pacific-Asia Workshop on Intelligence and Security Informatics, pp. 295-300 (2007).
Stanton, et al., "Analysis of end user security behaviors," Computers & Security 24(2), pp. 124-133 (2005).
Yackoski, et al., "Applying Self-Shielding Dynamics to the Network Architecture," Advances in Information Security 100, Moving Target Defense II, pp. 97-115 (2012).

(56) References Cited

OTHER PUBLICATIONS

Zank, "Moving Target Defense," Coronado Group, 6 pages (2012).
Zhuang, et al., "Simulation-based Approaches to Studying Effectiveness of Moving-Target Network Defense," National Symposium on Moving Target Research, 12 pages (2012).

* cited by examiner

SOFTWARE DEFINED NETWORKING MOVING TARGET DEFENSE HONEYPOT

STATEMENT OF GOVERNMENT INTEREST

This invention was made with government support under Contract No. DE-AC02-06CH11357 awarded by the United States Department of Energy to UChicago Argonne, LLC, operator of Argonne National Laboratory. The government has certain rights in the invention.

FIELD

The present disclosure relates generally to systems that thwart cyber-attacks and data theft by employing moving target defense ("MTD" hereafter). In particular, the disclosure relates to honeypot MTD systems and methods in software defined networking ("SDN") environments.

BACKGROUND

Cyber-attacks continue to pose a major threat to computing systems. Some attacks utilize unauthorized capture of data including network data. TCP/IP packets, for instance, contain data required for two network interfaces to communicate including source and destination IP addresses, ports, protocol type, etc. Unauthorized individuals may gain useful information on who is communicating and what is being communicated by intercepting packets at various levels and locations during the transit of the packets. Some attacks include attempts to gain unauthorized access to production systems and/or inject malicious code in various production applications.

SUMMARY

Software defined networking MTD honeypot is a dynamic network defense infrastructure, system and/or method designed to mitigate possible malicious behavior and improve systems and methods for intrusion detection.

According to one aspect, a computing system for moving target defense using software defined networking is described. The system comprises at least one processor, at least one memory, and instructions in order to receive a packet and identify a source identifier from the packet. Additionally, the computing system compares the source identifier to a predefined packet flow rule stored on a SDN switch. In some embodiments, the computing system determines that the packet does not meet the predefined packet flow rule and transmits the packet to a decoy controller. The decoy controller will compare the received packet with a configuration resource rule and determine if the packet violates the configuration rule. In some embodiments, the packet violates the configuration rule and the decoy controller modifies a portion of the packet to update the destination identifier with a decoy environment identifier. In some embodiments, the configuration rule is a whitelist. In some embodiments, the whitelist comprises application layer, link-layer, and/or transportation-layer data. In some embodiments, the application layer, link-layer, and/or transportation-layer data comprises of at least one VLAN identifier data, a destination address data, and a destination port data.

In some embodiments, the decoy controller is configured to transmit the modified packet to the SDN switch wherein, the SDN switch will route the packet to a decoy environment. More specifically, the SDN switch will compare the packet to a new predefined packet flow rule received from the decoy controller. If the SDN switch determines the packet violated the predefined packet flow rule, then the SDN switch will transmit the packet to a decoy environment. In some embodiments, the decoy environment is a virtualized resource comprising at least one of a virtual server and/or a virtual host. In some embodiments, the decoy controller transmits the packet to the SDN switch over a SSL communication channel and/or a TLS communications channel. In some embodiments, the decoy controller is housed within the SDN switch.

In some embodiments, the SDN switch determines the packet did not violate the configuration resource rule. In one example of the embodiment, the SDN switch will transmit the packet to a production environment.

In some embodiments, the SDN switch determines the destination of the packet based on a destination address wherein the destination address comprises of an IP subnet identifier. In some embodiments, the destination address is an IP address and a MAC address of a decoy host in the decoy environment. In some embodiments, the destination address is an IP address and/or a MAC address of a production host in the production environment.

In some embodiments, the packet received by the computing system comprises a first segment of a packet. In some embodiments, the first segment of the packet comprises a portion of a second segment of the packet. In some embodiments, the first segment of the packet comprises a copy of the content of the entire packet. In some embodiments, the first segment of the packet comprises a pointer to a memory location shared between the SDN Switch and the decoy controller.

In some embodiments, the at least one memory of the computing system is operable to generate a new packet flow rule comprising a property of the packet based on instruction from the configuration resource on the decoy controller. In some embodiments, the memory is configured to add the new packet flow rule on the SDN switch. In some embodiments, the memory is configured to route the packet to a first port associated with an application impersonation service on the decoy host in the decoy environment when executed by the processor. In some embodiments, the memory generates a decoy response message and transmits the decoy response message to a computing device associated with the source identifier on the packet. The decoy response message comprises of a time-out message, a service unavailable message, and/or a restricted access message.

In some embodiments, the memory, when executed by the processor, transmit the packet to a second port that is associated with an analytics application. The analytics application is configured to generate a visualization based on an evaluation of a payload, a metadata, a header, and/or a footer of the packet. In some embodiments, the memory, when executed by a processor, causes the analytics application generates a SDN switch rule recommendation based on the evaluation of the payload, metadata, header, and/or footer of the packet.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

These and other advantages and features of the invention, together with the organization and manner of operation thereof, will become apparent from the following detailed description when taken in conjunction with the accompanying drawings.

DETAILED DESCRIPTION

Referring to the Figures generally, systems and methods for intrusion detection are illustrated. In operation, a moving target defense system is embodied in whole or in part in an SDN switch and a controller structured to provide a multi-tier schema for identifying and routing confirmed malicious, potentially malicious, and/or legitimate traffic. If traffic is determined to originate from a known or potentially malicious actor, the traffic is routed to a decoy computing environment. One or more SDN switches are dynamically managed by the controller, which is structured to parse new packet(s), evaluate them against a whitelist, identify malicious traffic, create SDN switch entries to forestall future attacks, and re-route the offending packet(s), via the SDN switch, to a honeypot (decoy) environment, which may include application impersonation services to provide decoy applications, time-out messages, etc. Advantageously, this approach entices bad actors to think that their attacks have been successful and forestalls future attacks and/or redirects future traffic to decoy hosts. Further advantages include the ease of administration of the SDN switch configuration resource disclosed herein.

In the context of the present disclosure, the terms "route" and "re-route" generally encompass programmatic operations comprising modifying one or more aspects of a packet, such as metadata, header, footer, and/or payload. Destination information for a production environment is substituted with destination information for a honeypot (decoy) environment. Packets can be routed at various levels in the TCP/IP stack, including but not limited to modifying application-layer identifiers, such as HTTP routing information, TLS routing information, SSL routing information, SMTP routing information, etc. In some embodiments, packets can be modified at the transport and/or internet-link level, such as modifying routing identifiers specific to the TCP, UDP, SCTP, ICPMv4, ICMPv6 protocols, etc. Examples include modifying the ToS, protocol, source IP address, destination IP address, source port, destination port, etc. In some embodiments, link-layer packet items may be modified. These items source MAC address, destination MAC address, VLAN ID, VLAN priority, etc.

Figure 1:
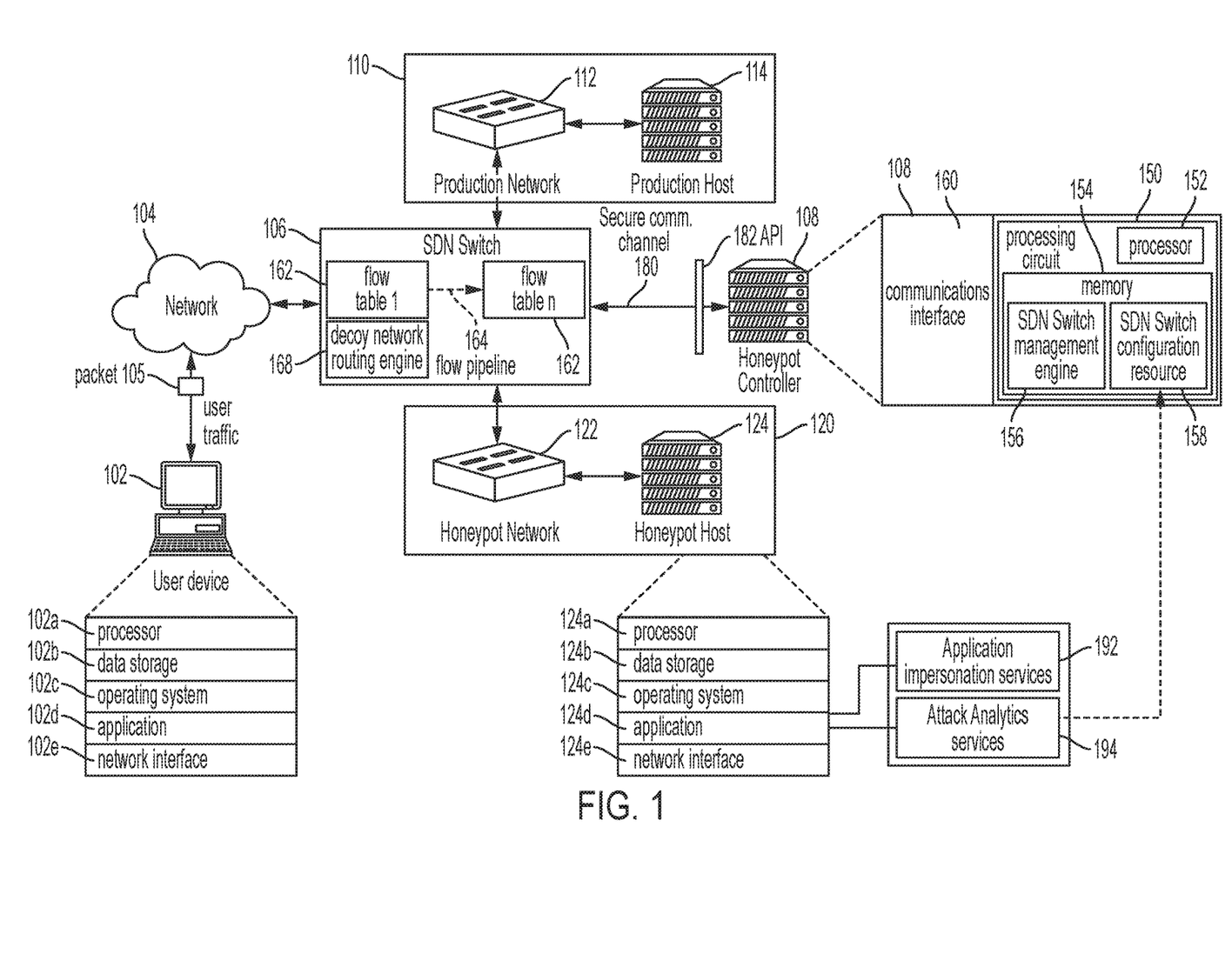
FIG. 1 is a block diagram of an environment including an SDN switch, communicatively coupled to a honeypot controller, to dynamically route malicious traffic to a host in a honeypot (decoy) network, according to an example embodiment.

Referring to FIG. 1, a block diagram of a computing environment including an SDN switch 106 is shown, according to an example embodiment. In an example embodiment, one or more host machines in the honeypot network 122 are configured to provide a decoy computing environment. The look, feel and functionality of the decoy computing environment can be determined by the operator (e.g., the system administrator) based on how the environment should be presented to an intruder. For example, the decoy computing environment may appear identical or similar to that of the production environment 110 but may provide restricted or no access to production-level applications or services. As shown, the SDN switch 106 is communicatively coupled to a honeypot controller 108. In operation, the SDN switch 106 and/or the honeypot controller 108 are programmatically configured to dynamically route malicious traffic to a honeypot host 124. The honeypot host 124 is a decoy computing system in a honeypot (decoy) network 122.

In an example embodiment, the computing environment of FIG. 1 comprises one or more user devices 102, the production environment 110, the SDN switch 106, the honeypot controller 108, and the honeypot environment 120. These components are communicatively coupled to one another via a network 104.

In the example embodiment of FIG. 1, the network 104 includes the Internet. In other arrangements or combinations, the network 104 includes a local area network and/or a wide area network. The operation of the network 104 is facilitated by short and/or long-range communication technologies, such as Bluetooth® transceivers, Bluetooth® beacons, RFID transceivers, NFC transceivers, Wi-Fi transceivers, cellular transceivers, microwave transmitters, software radio, wired network connections (e.g., Ethernet), etc. In the embodiment of FIG. 1, the network 104 is a packet-switched network, wherein one or more components may be communicatively coupled using one or more protocols, such as a TCP, UDP, SCTP, ICPMv4, ICMPv6, etc. Various components of the environment of FIG. 1 include network (communications) interfaces (e.g., network interface 102e of the user device 102, network interface 124e of the honeypot host, communications interface 160 of the honeypot controller 108, etc.) These interfaces allow the various components to exchange data via the network 104 (e.g., via the internet). According to various implementations, the interfaces include the hardware and logic necessary to communicate over multiple channels of data communication. For example, they may include one or more of an Ethernet transceiver, a cellular modem, a Bluetooth transceiver, a Bluetooth beacon, an RFID transceiver, and/or an NFC transmitter. Data passing through the interfaces may be encrypted such that the interfaces are secure communication modules.

As shown, the production environment 110 comprises one or more production hosts 114, which may be communicatively coupled via one or more production networks 112. These components are communicatively coupled to the SDN switch 106 via the one or more production networks 112. As shown, the user device(s) 102 is communicatively connected to the SDN switch 106. In some implementations, user device(s) 102 may comprise any of desktop computers, laptop computers, tablet computers, smart phones, e-readers, set top boxes, game systems, smartwatches, and the like. The user device(s) 102 are shown to contain a processor 102a, data storage 102*b*, an operating system 102*c*, an application 102*d*, and a network interface 102*e*. The data storage 102*b* may store machine instructions that, when executed by the processor 102*a*, cause the processor 102*a* to perform one or more of the operations described herein. The processor 102*a* may include one or more microprocessors, application specific integrated circuits (ASICs), field programmable gate arrays (FPGAs), other forms of processing circuits, or combinations thereof. The data storage 102*b* may include, but is not limited to, electronic, optical, magnetic, or any other storage or transmission device capable of providing the processor 102*a* with program instructions. The data storage 102*b* may include storage devices such as a floppy disk, CD-ROM, DVD, magnetic disk, memory chip, ROM, RAM, EEPROM, EPROM, flash memory, optical media, or any other suitable memory from which the processor 102*a* can read instructions and/or data. The processor 102*a* and the data storage 102*b* may form a processing module. The data storage 102*b* may include files to run an operating system 102*c* and an application 102*e*.

The user device(s) 102 originates or transmits traffic to the production environment 110 via the network 104. The term "traffic" generally refers to data communications between the user device 102 and one or more components of an enterprise computing environment, such as the production environment 110 and honeypot environment 120. For example, the user device 102 may submit requests to access various resources (e.g., applications, webpages, services, operating system management functions, file system management functions, system configuration functions, etc.) on the production host 114 of the production environment 110. The flow of traffic via the network 104 is multi-directional such that the user device 102 may receive return traffic originated by the production host 114, honeypot host 124, etc. The return traffic to the user device 102 via the network 104 may comprise data responsive to user requests to access the resources on the respective computing system (e.g., on the production host 114).

The traffic is segmented into packets 105. Each packet 105 is a formatted unit for the data carried via the network 104. As used herein, the term "packet" may refer to formatted units at various levels of the open systems interconnection (OSI) networking and/or TCP/IP models, such that the terms "packet", "segment", "datagram", and "frame" may be used interchangeably. Metadata can be understood to be included in a packet (e.g., in a header, footer, etc.) or to be distinct from a packet, such as metadata generated by the SDN switch 106. Each packet 105 contains payload (e.g., data carried on behalf of an application) encapsulated with routing information. A payload can be understood to be included in a packet. As used herein, the term "payload" may refer to the data portion of a packet and/or may include various application-layer and/or link-layer information. For example, in addition to a payload, application-layer and/or link-layer in an example packet 105, may contain a header and/or footer that may include a source address of the sending host (e.g., the user device 102, production host 114, or honeypot host 124), destination address of the target host, a source port, a destination port, a checksum or other error detection and correction information, packet priority, traffic class, and/or type of service (ToS), packet length, etc. In embodiments where the network 104 comprises one or more virtual local area networks (VLANs), such that, for example, the production environment 110 and the honeypot environment 120 are on different VLANs, the packet 105 may also contain a VLAN identifier. Any of the foregoing items in the packet 105, and/or additional suitable components, may be used by the honeypot controller 108, once the packet 105 is parsed into segments, to programmatically route traffic based on a determination whether traffic, represented by one or more packets 105, is malicious, potentially malicious, or legitimate, as described further herein.

The embodiment of FIG. 1 includes a production environment 110, which provides legitimate applications and services, and a decoy honeypot environment 120, where packets 105 are redirected in case of an attack (e.g., a violation of whitelisted rules). In the embodiment of FIG. 1, each of the production environment 110 and the honeypot environment 120 may contain one or more host machines (e.g., the production host 114, the honeypot host 124) that are communicatively coupled via one or more networks (e.g., the production network 112, the honeypot network 122).

An example host machine of the production environment 110 and/or the honeypot environment 120 can include some or all components described with respect to the honeypot host 124, such as one or more processors 124*a*, data storage 124*b*, operating system 124*c*, application 124*d*, and network interface 124*e*. The data storage 124*b* may store machine instructions that, when executed by the processor 124*a*, cause the processor 124*a* to perform one or more of the operations described herein. The processor 124*a* may include one or more microprocessors, application specific integrated circuits (ASICs), field programmable gate arrays (FPGAs), other forms of processing circuits, or combinations thereof. The data storage 124*b* may include, but is not limited to, electronic, optical, magnetic, or any other storage or transmission device capable of providing the processor 124*a* with program instructions. The data storage 124*b* may include storage devices such as a floppy disk, CD-ROM, DVD, magnetic disk, memory chip, ROM, RAM, EEPROM, EPROM, flash memory, optical media, or any other suitable memory from which the processor 124*a* can read instructions and/or data. The processor 124*a* and the data storage 124*b* may form a processing module. The data storage 124*b* may include files to run an operating system 124*c* and an application 124*e*. The application 124*e* can include one or more object files, executable files, webpages, etc. stored in the data storage 124*b*, that, when executed by the processor 124*a*, deliver to the user and/or administrator of the system various resources (e.g., applications, webpages, services, operating system management functions, file system management functions, system configuration functions, etc.) In the example embodiment, the application 124*d* includes application impersonation services 192 and attack analytics services 194.

In the embodiment of FIG. 1, the production network 112 and the honeypot network 122 are secured subsets of the network 104. An example network of the production environment 110 and/or the honeypot environment 120 (e.g., the production network 112, the honeypot network 122) can include various equipment to facilitate communications, such as routers, switches, Bluetooth® transceivers, Bluetooth® beacons, RFID transceivers, NFC transceivers, Wi-Fi transceivers, cellular transceivers, microwave transmitters, software radio, wired network connections (e.g., Ethernet), etc.

In some embodiments, the production network 112 and/or the honeypot network 122 comprise one or more virtualized network resources, such as virtual switches, virtual routers, virtual hosts, virtual servers, etc. For example, the production network 112 and/or the honeypot network 122 can be and/or can include one or more virtual local area networks (VLANs), which may be managed by the SDN switch 106.

For example, the production environment 110 and the honeypot environment 120 may each include different virtual networks (VLANs), each defined by the SDN switch 106 to represent a grouping of servers (e.g., application servers, database servers, etc.) by business unit (e.g., end-user banking applications, accounting applications, etc.), by function (e.g., system management services, backup management services, etc.), and so forth. In some embodiments, the honeypot controller 108 is configured to evaluate packets 105 and manage the flow of traffic using VLAN identifiers. For instance, in one embodiment, the production environment 110 and the honeypot environment 120 are on different VLAN networks, such that packets 105 are routed to the appropriate VLAN based on whether traffic comprising packets 105 is determined to be malicious, potentially malicious, or legitimate. As another example, the honeypot host 124 may be a virtual server and/or a virtual host that may share physical storage, hardware, and other resources with other virtual machines. In some embodiments, virtual resources of the production network 112 and/or the honeypot network 122 may include cloud computing resources such that, for example, a virtual resource may rely on distributed processing across more than one physical processor, distributed memory, etc.

In operation, the production environment 110 includes production systems configured to respond to legitimate traffic via the network 104, whereas the honeypot environment 120 includes decoy systems structured to impersonate production-level systems and services of the production environment 110 without providing access to actual production systems when malicious traffic is detected. For example, once malicious traffic is detected, it can be directed, by the honeypot controller 108 and the SDN switch 106, away from the production environment 110. Once their requests are redirected to one or more decoy systems, such as those residing on the honeypot host 124, attackers are tired out and/or deterred through restriction of access, time-out messages, service/application unavailable messages, and other tactics. In some embodiments, attackers are given access to a restricted-access honeypot environment 120 (e.g., where applications lack the functionality of production applications) and monitored by a system administrator. In an example use case, in the event that an attacker, e.g., from the user device 102, sends a request that does not match a list of expected services on the SDN switch 106, the honeypot controller 108 may direct the SDN switch 106 to route the packets 105 and further traffic from the user device 102 to the honeypot host 124 via the honeypot network 122.

In the embodiment of FIG. 1, the SDN switch 106 includes software- and/or hardware-based circuitry structured to receive, transform and forward data between each of the production network 112, honeypot network 122, and user device 102. Thus, the SDN switch 106 is communicatively coupled to each of the production network 112 and the honeypot network 122. Each of the production network 112 and the honeypot network 122 may comprise programmable network architectures, which can be deployed, managed, configured, secured, and administered using the SDN switch 106. The SDN switch 106 may be configured to modify incoming packets 105 (e.g., from the user device 102) with a destination address and port of the honeypot host 124. In some embodiments, the SDN switch 106 modifies incoming packets 105 with a destination address and port of the honeypot host 124 and transmits the packets 105 to the production network 112. In some embodiments, the SDN switch 106 modifies incoming packets 105 with a destination address and port of the honeypot host 124 and transmits the packets 105 to the honeypot network 124. Advantageously, to ensure that the production network 112 remains secured, the honeypot host 124 is not able to communicate (e.g., transmit packets 105) directly to production machines within the production network 112, and vice versa. In some implementations, the SDN switch 106 is configured to generate and send Ethernet frames.

In one example embodiment, the SDN switch 106 is an OpenFlow-enabled switch. However, one skilled in the art will appreciate that some or all of the functionality of the SDN switch 106 can be implemented by circuitry structured to perform operations according to another suitable protocol, such as open v-switch database management protocol (OVSDB), border gateway protocol (BGP), extensible messaging and presence protocol (XMPP), multiprotocol label switching (MPLS), NETCONF, OpFlex, and so forth.

The SDN switch 106 comprises a decoy network routing engine 168. The decoy network routing engine 168 is structured to populate the flow tables 162 with entries. In some embodiments, the decoy network routing engine 168 is included in the honeypot controller 108. In some embodiments, the decoy network routing engine 168 transmits the packet 105 to the honeypot environment 120. In some embodiments, the decoy network routing engine 168 transmits the packet 105 to the production environment 110.

The entries in the flow tables 162, discussed further herein, are used (e.g., retrieved from data storage associated with the SDN switch 106, read, and compared to segments of the packets 105) by the decoy network routing engine 168 of the SDN switch 106 in order to manage traffic from and to the user device 102. In particular, the SDN Switch management engine 156 transmits an entry through the secure communication channel 180 to the SDN switch 106. Within the SDN switch 106, the decoy network routing engine 168 receives the entry and populates the flow table 162. In some embodiments, the SDN switch management engine 156 assigns a priority number to the entry prior to transmitting the flow to the SDN switch 106.

In some embodiments, the decoy network routing engine 168 may be configured to modify any packets 105 addressed to production host 114 with the destination address and port of the honeypot host 124.

In some embodiments, the decoy network routing engine 168 may be configured to receive flow modification from the honeypot controller 108. For example, a flow modification may configure SDN switch 106 to modify any packets 105 that meet particular flow rules from the flow tables 162 such that the destination IP address, destination MAC address, destination port, etc. of the packet 105 are changed according to the flow rules (e.g., such that the packet 105 is routed to the honeypot host 124 instead of the production host 114 as intended by a malicious actor using the user device 102).

The SDN switch 106 comprises one or more flow tables 162. According to various embodiments, the flow tables 162 can be implemented as text files, XML files, one or more databases, and so forth. Each of the one or more flow tables 162 store the rules (e.g., programmatically deployed configuration parameters) for routing traffic. In an example embodiment, one or more flow tables 162 each contain an entry (a "flow"). Each entry is associated with an OpenFlow classifier and an action to be performed based on the classifier. An action may include routing of the packet 105 to the honeypot network 122.

Each OpenFlow classifier in the flow table 162 represents a parameter and/or a combination of parameters that match a characteristic of the packet 105. Herein, the "characteristic" is defined as a portion of a parsed packet 105, such as a portion of a header of the packet 105, a footer of the packet 105, and/or the payload of the packet 105. Some characteristics are considered to meet the selection criteria defined by a classifier if the value of the characteristic (e.g., a bit sequence or character string) exactly matches the condition of the classifier. For example, a "port" value in the packet 105 must exactly match a port number defined by the classifier in order to meet the conditions of the rule in the flow table. Other characteristics are considered to meet the selection criteria defined by a classifier if the value of the characteristic (e.g., a bit sequence or character string) matches in part the condition of the classifier. For example, a "source IP address" value in the packet 105 can partially match an IP address such that traffic from a range of IP addresses may be considered malicious, based on the flow rules in the flow table 162, and routed by the decoy network routing engine 168 to the honeypot network 122. In some embodiments, the segment comprises a single bit or character.

In order to reduce the storage space of flow tables in data storage associated with the SDN switch 106 and to prevent the overflow of any single flow table 162 (as in when a malicious actor floods the production network 112 with traffic, which may result in the installation of multiple new rules on the SDN switch 106), in some embodiments, the SDN switch comprises multiple flow tables 162. In some embodiments, each of the flow tables 162 is size-limited. To save storage resources, in some embodiments, the action field for a flow entry in a first instance of the flow table 162 may specify that a packet 105 should be routed to a second instance of the flow table 162 if the packet 105 meets the specified criteria defined by the classifier in the first flow table, wherein the entries in the flow tables may relationally link these tables.

To illustrate, in some embodiments, the SDN switch 106 may be configured such that certain packets 105 are subject to a multi-tier routing hierarchy, wherein a first classifier in the first instance of the flow table 162 is structured to evaluate, e.g., a source IP address and a second classifier in the second instance of the flow table 162 is structured to evaluate, e.g., the a portion of the payload of the packet 105. In some embodiments, a two different entries in the second instance of the flow table 162 are structured to direct the decoy network routing engine 168 to a different hosts 124 in the honeypot environment 120, to different ports (e.g., associated with different applications 124d) on the same honeypot host 124, etc. For example, malicious HTTP GET requests for a first application in the production environment 110 may be redirected differently from HTTP GET requests for a second application, in order to generate realistic decoy application traffic (e.g., application impersonation traffic) to the user device 102.

In some embodiments, as each packet 105 travels through a series of flow tables 162, the packet 105 becomes part of the flow pipeline 164. In some embodiments, packets 105 are added and removed from the pipeline in a first-in-first-out (FIFO) manner such that each packet 105 is processed sequentially. In some embodiments, packets 105 in a flow pipeline 164 are added and removed based on a priority assigned to a flow in the flow tables 162. In one example embodiment, the SDN switch 106 will execute a flow with a higher assigned priority when malicious traffic is identified such that packets 105 in the flow pipeline 164 may be transmitted to the honeypot environment 120.

The SDN switch 106 is managed by the honeypot controller 108. In some embodiments, the honeypot controller 108 is a standalone server or a collection of servers. The honeypot controller 108 includes software- and/or hardware-based circuitry structured to manage the operations of the SDN switch 106. In some embodiments, honeypot controller 108 is implemented within a single computer (e.g., one server, one housing, etc.). In various other embodiments honeypot controller 108 can be distributed across multiple servers or computers (e.g., that can exist in distributed locations). Further, while FIG. 1 shows the flow table 162, decoy network routing engine 168, and API 182 as existing outside of honeypot controller 108, in some embodiments, these components can be hosted within honeypot controller 108 (e.g., within memory 154).

According to various embodiments, the honeypot controller 108 may comprise a processing circuit 150 including a processor 152 and memory 154. The processing circuit 150 can be communicatively connected to the communications interface 160 such that processing circuit 150 and the various components thereof can send and receive data via the communications interface 160. Processor 152 can be implemented as a general purpose processor, an application specific integrated circuit (ASIC), one or more field programmable gate arrays (FPGAs), a group of processing components, or other suitable electronic processing components. Memory 154 (e.g., memory, memory unit, storage device, etc.) can include one or more devices (e.g., RAM, ROM, flash memory, hard disk storage, etc.) for storing data and/or computer code for completing or facilitating the various processes, layers and modules described in the present application. Memory 154 can be or include volatile memory or non-volatile memory. Memory 154 can include database components, object code components, script components, or any other type of information structure for supporting the various activities and information structures described in the present application. According to an example embodiment, memory 154 is communicatively connected to processor 152 via processing circuit 150 and includes code and/or instructions for executing (e.g., by the processor 152) one or more processes described herein.

Memory 154 is shown to include an SDN switch management engine 156 and an SDN switch configuration resource 158.

The SDN switch configuration resource 158, discussed further herein, is used (e.g., retrieved from memory 154, read, parsed, etc.) by the SDN switch management engine 156 in order to manage traffic to and from the SDN switch 106. According to various embodiments, the SDN switch management engine 156 may be structured to receive and parse a packet 105, extract a segment (e.g., a bit sequence or character string) of the packet 105, identify an actual attack based on a segment of the packet 105, identify a potential attack based on the packet 105, identify legitimate traffic based on the packet 105, create, delete, and manage (e.g., restrict the size of) one or more flow tables 162 on the SDN switch 106, add entries to one or more flow tables 162, and so forth. In operation, the SDN switch management engine 156 may be structured to perform some or all of the operations described in reference to FIG. 2.

The SDN switch configuration resource 158 is structured to provide the information needed by the honeypot controller 108 to determine whether a particular packet 105 represents an attack or legitimate traffic. Advantageously, to facilitate administration of the environment of FIG. 1 by system administrators, the SDN switch configuration resource 158 is an easy-to-administer configuration file, such as a text file, XML file, etc. According to various embodiments, the SDN switch configuration resource 158 can be implemented as a whitelist, a blacklist, a multi-level conditional list, an alert definition schema, etc. In an example embodiment, the SDN switch configuration resource 158 is a whitelist shown schematically in FIG. 3. Advantageously, to prevent the honeypotting of false positives (i.e. to prevent routing legitimate traffic to decoy applications of the honeypot environment 120 of FIG. 1), any of the header, footer, and/or even payload of the packet 105 can be parsed to identify items configurable via the SDN switch configuration resource 158.

The honeypot controller 108 is communicatively coupled to the SDN switch 106 via a secure communication channel 180. In the example embodiment, the secure communication channel 180 is an OpenFlow channel, which can be implemented over SSL, TLS, and so forth. The SDN switch 106 receives instructions (e.g., commands, set-points, etc.) from the honeypot controller 108. In some embodiments, the SDN switch management engine 156 may be configured to send flow modification instructions to the SDN switch 106. For example, a flow modification instruction may configure the SDN switch 106 to modify any packets 105 that meet particular flow rules from the flow tables 162 such that the destination IP address, destination MAC address, destination port, etc. of the packet 105 are changed according to the flow rules (e.g., such that the packet 105 is routed to the honeypot host 124 instead of the production host 114 as intended by a malicious actor using the user device 102). In some embodiments, the SDN switch management engine 156 may be configured to create a flow that is transmitted to the SDN Switch 106. In one example of this embodiment, the flow contains OpenFlow Classifier information and an action, the OpenFlow Classifier information is determinative from a packet 105 received by the honeypot controller 108. Further, the SDN switch management engine 156 may be configured to assign a priority number to the flow such that the decoy network routing engine 168 executes the flow over existing flows on the flow tables 162.

In some embodiments, communications via the secure communication channel 180 may be carried out using an application programming interface (API), such as the API 182. In some embodiments, the SDN switch management engine 156 of the honeypot controller 108 and/or the SDN switch 106 include all or parts of the API 182. In some embodiments, the API 182, independently or in conjunction with communication interface(s) of the SDN switch 106 and the honeypot controller 108, is structured to encode, decode, receive, and transmit the various data items (e.g., messages) included in the data streams exchanged between these systems. According to various embodiments, the API 182 can be implemented as software code suitable for compilation, object code, executable file(s) and/or code, and/or in another suitable form for carrying out the computer-implemented method(s) described herein. In some embodiments, API 182 may be configured to specify an appropriate communication protocol using a suitable data interchange format, including any of a SQL data set, a protocol buffer message stream, an instantiated class implemented in a suitable object-oriented programming language (e.g., Python, Java, Ruby, C#, etc.), an XML item, a web service message in a suitable message format (e.g., representational state transfer (REST), simple object access protocol (SOAP), web service definition language (WSDL), JavaScript object notation (JSON), XML remote procedure call (XML RPC), etc.). Further, in some embodiments, the API 182 may be installed on or configured to call executable functions residing on one or more web service node(s) (not shown). These executable functions can be structured to encode, decode, send and receive REST messages, SOAP messages, WSDL messages, JSON messages, XML RPC messages, etc. In an example embodiment, information can be exchanged between the SDN switch 106 and the honeypot controller 108 in the form of OpenFlow messages.

Referring now to the honeypot network 122, the honeypot host 124 on the honeypot network 122 may comprise one or more applications (e.g., application impersonation services 192) structured to provide, via the network interface 124e, decoy services to the user device 102, which may appear to be identical to those of the production network 112 but return errors, connection timeout messages, etc. In some embodiments, the one or more applications (e.g. application impersonation services 192) may not appear to be identical to those of the production network 112 and return errors, connection timeout messages, etc.

The honeypot host 124 may comprise attack analytics services 194, whereby the honeypot host 124 is enabled to record all or some activity performed on the honeypot host 124 so that system administrators may build a profile, using attack analytics services 194, of potentially hostile actions from one or more user devices 102. The potentially hostile actions can be associated with potentially hostile devices, which may be clustered by the attack analytics services based on a shared characteristic.

The shared characteristics can include items that are common, in whole or in part, among a plurality of packets 105. For example, the shared characteristics may include packet header and/or footer items, such as a source address of the sending host, destination address of the target host, a source port, a destination port, a checksum or other error detection and correction information, packet priority, traffic class, and/or type of service (ToS), packet length, and other items supported by the classifier stack of a suitable SDN programming protocol, such as OpenFlow. In some embodiments, the shared characteristics may include custom classifiers, such as subsets of payload/data within the packet 105. In some embodiments, the shared characteristics may include a plurality of items, such as both the header/footer items and a subset of the payload of shared by a plurality of packets 105.

For example, attack analytics services 194 may generate a cluster based on a determination that a plurality of TCP packets 105 all contain malicious HTTP requests structured to circumvent security protections on a particular resource on the production host 114. This determination may be made, for example, by parsing each TCP packet 105 in the plurality of packets 105 and determining whether these packets 105 share header/footer information (e.g., source and destination domains, source and destination subnets, source and destination ports, etc.) and/or also share payload information (e.g., the segment of the payload that identifies an HTTP request and/or includes the body of the HTTP request, such as a GET request containing malicious request parameters such as those indicative of a SQL injection attack, etc.)

In some embodiments, the shared characteristics can include items that are inferred based on the shared characteristics of the packets 105, such as, for example, a geographical location that may be inferred based on a subset of IP addresses shared by a plurality of packets 105. In another example, attack analytics services 194 may cluster such packets 105 and infer various types of attacks. For example, a brute force attack may be inferred by analyzing the frequency of an HTTP POST requests with particular parameters in the payload of each packet 105. The POST requests may be analyzed in conjunction with header/footer information in order to make an inference regarding whether an attacker, such as a particular user device 102 or a set of user devices 102, has attempted to impersonate a system administrator for a resource on the production host 114 by using brute force to guess the administrator user name and password.

To make such inferences, attack analytics services 194 may comprise an artificial intelligence circuit, which may be structured to use suitable techniques (e.g., machine learning techniques such as naïve Bayes classifier, k-means clustering, nearest neighbor analysis, linear regression, logistic regression, neural networks, etc.) to programmatically make the inferences from data in the clusters comprising a plurality of packets 105. Attack analytics services may comprise program modules implemented in a suitable language, such as Python, R, etc. that may embody particular implementations of the above machine learning techniques. In some embodiments, attack analytics services 194 can be further configured to programmatically provide rule recommendations for deployment on the honeypot controller 108 and/or on the SDN switch 106. In some embodiments, the rule recommendations are based on the analysis of clusters as discussed above.

Figure 2:
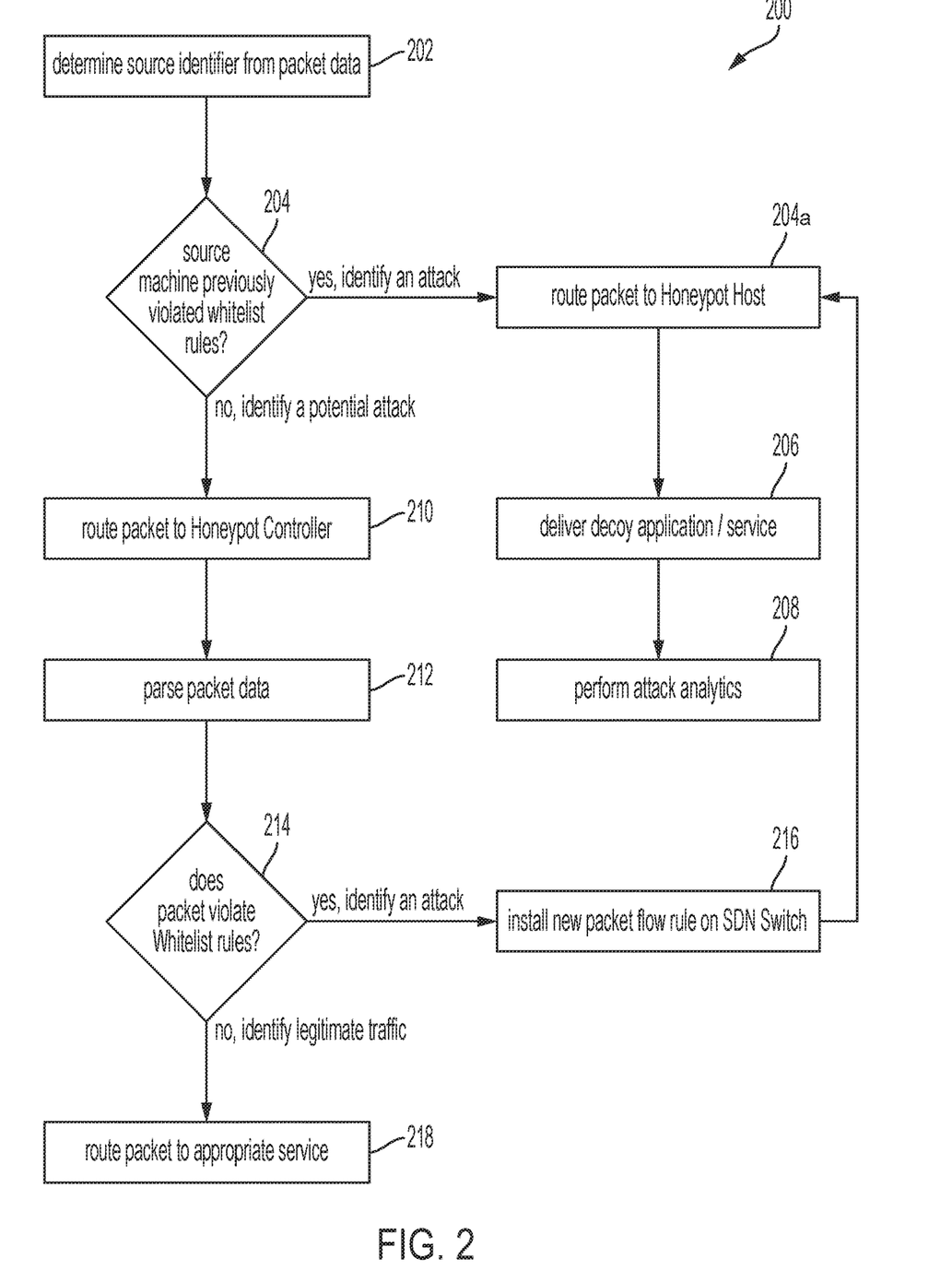
FIG. 2 is a flow diagram of a method of dynamically routing malicious traffic to a host in a honeypot network, according to an example embodiment.

Referring to FIG. 2, a flow diagram of a method 200 for of dynamically routing malicious traffic to a honeypot host 124 in a honeypot network 122 is shown, according to an example embodiment. The operations of the method 200 are described with reference to the components of the accompanying Figures.

The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting. In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more entities (e.g., user device(s) 102, SDN switch 106, honeypot controller 108, production host 114, honeypot host 124) executing some or all of the operations of method 200 in response to instructions stored electronically on an electronic storage medium.

Method 200 may comprise determining, by the SDN switch 106, a source identifier from packet data for a packet 105 (202). In operation, a source machine such as user device 102 may be sending packets 105 that may represent an attack, a potential attack, and/or legitimate traffic. According to various embodiments, the source identifier may comprise any data sufficient to programmatically identify a source (originator or transmitter) of the packet 105, such as the user device 102. In some embodiments, one or more flow tables 162 are consulted in making this determination such that the source identifier corresponds to one or more entries in the one or more flow tables 162. In some embodiments, the packet 105 is programmatically parsed (e.g., broken down into parts such that only certain characters, values and/or bits are extracted) to make this determination. In some embodiments, the source identifier data includes header and/or footer data from the packet 105 such as a full or partial IP address, a full or partial MAC address, arrival port on the SDN switch 106, etc. In some embodiments, the source identifier data includes payload data of the packet 105, such that the packet 105 is considered to meet the selection criteria defined by a classifier of the flow table 162 if the value of the payload item (e.g., a bit sequence or character string) matches the condition of the classifier. In some embodiments, the source identifier data include all or parts of an OpenFlow key created for the packet 105 by the SDN switch 106 when the packet 105 arrives at the SDN switch 106 via the network 104. These values may include metadata about the packet 105 such as location of the buffered packet, header values, arrival port, arrival clock, etc. Any and/or all of the foregoing may serve as inputs for the SDN switch 106 to determine a source identifier from packet data using one or more flow tables 162.

Method 200 may comprise determining whether user device 102 identified by the source identifier has previously violated one or more rules, such as the rules defined by entries in the flow table 162 of the SDN switch 106 (at 204). For example, a determination may be made whether a particular MAC address, IP address, IP subnet, another value and/or a combination thereof has previously been associated with a malicious attack of any kind. Additionally or alternatively, method 200 may comprise determining whether user device 102 identified by the source identifier violates one or more currently defined rules, such as the rules defined in the flow table 162 of the SDN switch 106. For example, a determination may be made whether a first MAC address, IP address, IP subnet, and/or a combination thereof violates a new OpenFlow rule created and installed on the SDN switch 106 in response to identifying a particular type of payload-based attack (e.g., a SQL injection attack) from a second MAC address, IP address, IP subnet, and/or a combination thereof. One or more of the flow tables 162 and/or entries therein may be used by the SDN switch 106 to make this determination.

If the determination at 204 yields an affirmative result, the method 200 may comprise routing the packet 105 to the honeypot host 124 (at 204a). In some embodiments, the packet 105 may be routed using an OpenFlow message. In some embodiments, the packet 105 may be routed to a particular physical or virtual port on the honeypot host 105. For example, a particular physical or virtual port may be associated with particular application impersonation services 192 to deliver (at 206) an appropriate decoy application, decoy environment, decoy response message, etc. based on an evaluation of the contents (e.g., key, header, footer, payload) of the packet 105. In various arrangements, the decoy response message may include a message designed to deter the attacker associated with the user device 102 from pursuing further attacks by delivering an application time-out message, a service unavailable message, a restricted access message, etc. In some embodiments, attack analytics services 194 are structured to perform attack analytics on the packet 105 (208) and/or programmatically recommend new rules, rule deletions, rule modifications, etc. for installation on the SDN switch 106.

If the determination at 204 yields a negative result (for example, when the packet 105 does not match any existing rules in one or more flow tables 162 but may nevertheless constitute a potential attack), the method 200 may comprise routing the packet 105, by the decoy network routing engine 168 of the SDN switch 106, to the honeypot controller 108 (210). Advantageously, this process helps identify a new potential attack. In some embodiments, the packet 105 may be routed to the honeypot controller 108 via the secure communication channel 180 over SSL, TLS, and so forth. In some embodiments, the packet 105 may be routed using the API 182. In some embodiments, the packet 105 may be routed using an OpenFlow message. In some embodiments, a copy of the packet 105 or a portion thereof is routed. In some embodiments, a virtual pointer to the packet 105 or a portion thereof is routed. The packet 105 may be stored in the memory 154 of the honeypot controller 108 (e.g., cashed, written to disk, written to a log file, etc.).

If the determination at 204 yields a negative result (for example, when the packet 105 does not match any existing rules in one or more flow tables 162), the method 200 may comprise parsing the packet 105 (212). The parsing operations may be performed by the decoy network routing engine 168 of the SDN switch 106 and/or the SDN switch management engine 156 of the honeypot controller 108. In some embodiments, an entire packet 105 is routed to the honeypot controller 108, which extracts one or more values from a portion of the packet 105 (e.g., extracts an OpenFlow key that may be structured to identify a particular packet 105 to the SDN switch 106 throughout the lifecycle of the packet 105, header, footer, payload, etc.) In some embodiments, instead of routing the entire packet 105 to the honeypot controller 108, the SDN switch is configured to parse the packet 105 as described, for example, with reference to 204, and route only certain metadata associated with a particular packet 105 (e.g., the OpenFlow key) and/or a subset of information from the header, footer, and/or payload of the packet 105.

If the determination at 204 yields a negative result (for example, when the packet 105 does not match any existing rules in one or more flow tables 162), the method 200 may comprise determining whether the packet 105 violates one or more rules, such as the rules defined in the SDN switch configuration resource 138. In order to make this determination, all or a portion of the packet 105 (e.g., the parsed data of 212) is compared to criteria for one or more rules. In some embodiments, these rules and criteria are defined in the SDN switch configuration resource 158. In some embodiments, the SDN switch management engine 156 is structured to access (retrieve from the memory 154, read, query, etc.) the SDN switch configuration resource 158 to obtain the relevant criteria. In some embodiments, wildcard-type matching is used such that a criterion is met only if a part of the information under evaluation matches the criteria from the SDN switch configuration resource 158. For example, information under evaluation from the packet 105 may comprise an IP address, and the SDN switch configuration resource 158 may comprise a list (e.g., a whitelist) inclusive of one or more subnets are considered safe. If a part of the IP address matches the subnet included in the whitelist, the packet 105 may be considered legitimate traffic. In other embodiments, the information under evaluation must match a criterion exactly.

If the determination at decisional 214 yields an affirmative result (that is, if information under evaluation from the packet 105 violates the whitelist), the method 200 may include adding a new rule (e.g., a new entry in the flow table 162, new entries in multiple flow tables 162, and/or creation of a new flow table 162) on the SDN switch 106 (216). In some embodiments, the new rule may include all or a portion of the packet 105 (e.g., all or a portion of information under evaluation) as a criterion for the new rule. The information may include, for example, an IP address, a MAC address, a physical or virtual port, etc. Generally, this information may include any suitable OpenFlow item or a combination thereof. In some embodiments, the new rule may further include a numerical priority designation. More specifically, the numerical priority designation allows the decoy network routing engine 168 or the SDN switch management engine 156 to identify which rule on the flow tables 162 to execute. Due to the higher priority attached to the new rule, decoy network routing engine 168 or the SDN switch management engine 156 may execute the new rule such that the SDN switch 106 matches packets 105 in the flow pipeline 164 with the new rule. In this embodiment, the existing rules are not matched to the packet 105 even though they may still exist on the flow tables 162. In some embodiments, the existing rules on the flow tables 162 will expire due to a timeout value being reached. In some embodiments, the new rule may further include a timeout value (e.g., in days, hours, minutes, seconds, milliseconds, etc.) In some embodiments, the timeout value is an idle timeout value indicative of when the new rule should be removed from the SDN switch 106 due to a lack of traffic meeting the criteria of the new rule. In some embodiments, the timeout is a hard timeout value indicative of when the new rule should be removed from the SDN switch 106 regardless of traffic meeting the criteria. In some embodiments, instead or in addition to creating a new rule, the SDN switch management engine 156 is structured to modify an existing entry in the flow table 162 on the SDN switch 106. In some embodiments, the SDN switch management engine 156 is structured to generate a notification to a system administrator (e.g., a log file entry, an email, etc.) to report on the creation or modification of a rule, the count of packets 105 meeting the rule, the information under evaluation, etc. In some embodiments, the SDN switch management engine 156 may be structured to route the packet 105 back to the SDN switch 106 for processing via the flow pipeline 164 under the new or modified rules. In some embodiments, for example, where the flow pipeline 164 is a FIFO queue, a previously stored copy of the packet 105 may be removed from the flow pipeline 164. In some embodiments, to decrease the amount of bandwidth used on the secure communication channel 180, instead of sending back to the SDN switch 106 the entire packet 105, the SDN switch management engine 156 is structured to send a copy of the packet 105 or its metadata, such as the OpenFlow key, to the SDN switch 106. In some embodiments, such as when the memory 154 and/or storage media associated with the SDN switch 106 is structured to be accessible to both the SDN switch 106 and the honeypot controller 108, the SDN switch management engine 156 may be structured to send a virtual pointer to the packet 105 or its metadata, such as the OpenFlow key, to the SDN switch 106.

If the determination at decisional 214 yields a positive result (that is, if information under evaluation from the packet 105 does not violate the whitelist), the method 200 may include routing the packet 105 to the production environment 110 (e.g., to the production host 114) and/or delivering the operation and/or service requested by a user through the user device 102.

Figure 3:
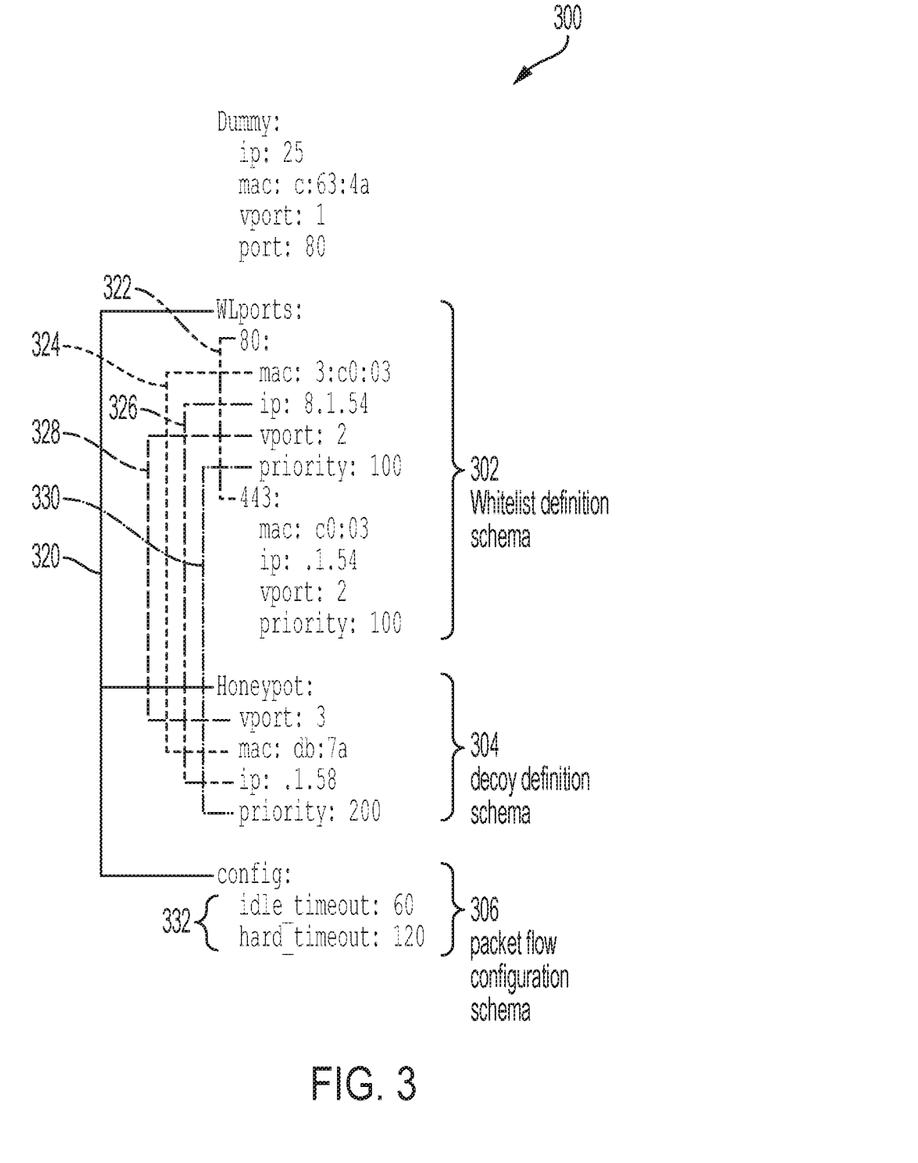
FIG. 3 is a schematic representation of an example SDN switch configuration resource for dynamically routing malicious traffic to a host in a honeypot network, according to an example embodiment.

FIG. 3 illustrates an example SDN switch configuration resource 300 for dynamically routing malicious traffic to a honeypot host 124 in a honeypot network 122, according to an example embodiment. As shown, the SDN switch configuration resource 300 is a whitelist such that the SDN switch configuration resource 300 defines packets 105 and/or user devices 102 that can be considered safe to be granted access to the production environment 110. According to various embodiments, the SDN switch configuration resource 300 can be a text file, an XML resource, etc. In the example embodiment, the SDN switch configuration resource 300 is a text file that is loaded into memory 154 on startup of the honeypot controller 108. In the example embodiment, the memory 154 is transitory memory. In some embodiments, the SDN switch configuration resource 300 can be permanently stored in memory 154.

As shown, the SDN switch configuration resource 300 comprises a whitelist definition schema 302, a decoy definition schema 304, and a packet flow configuration schema 306.

The whitelist definition schema 302 specifies the rules and criteria for a packet 105 to be considered part of safe (legitimate) traffic. The decoy definition schema 304 specifies the rules and criteria for a packet 105 to be considered part of an attack (malicious) traffic. The whitelist definition schema 302 and/or the decoy definition schema 304 may include any suitable criteria that can be met by all or a part of a packet 105 (e.g., header, footer, payload) and/or metadata associated with the packet 105 (e.g., an OpenFlow key that uniquely identifies the packet 105 to the SDN switch 106). According to various embodiments, these criteria may include properties of packet 105 associated with various levels of the TCP/IP stack. For example, an application-layer instance of the packet 105 may include items such as data and process-to-process routing information. Examples include HTTP routing information, TLS routing information, SSL routing information, SMTP routing information, etc. A transport-layer or internet-layer instance of the packet 105 may include host-to-host routing information and identifiers, such as routing information specific to the TCP, UDP, SCTP, ICPMv4, ICMPv6, etc. Examples include ToS, protocol, source address, destination address, source port, destination port, etc. A link-layer instance of the packet 105 may include frame- and machine-related data such as source MAC, destination MAC, type of packet, length of packet, VLAN ID, VLAN priority, etc. One or more of the foregoing items can be substituted in the packet 105 to route packet 105 to the appropriate environment and/or host.

The packet flow configuration schema 306 includes configuration settings for implementing traffic routing rules on the SDN switch 106. For example, the packet flow configuration schema 306 may include flow table and/or flow entry timeout settings, packet priority settings, flow pipeline management settings, etc.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

As noted above, implementations within the scope of this disclosure include program products comprising non-transitory machine-readable media for carrying or having machine-executable instructions or data structures stored thereon. Such machine-readable media can be any available media that can be accessed by a general purpose or special purpose computer or other machine with a processor. By way of example, such machine-readable or non-transitory storage media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Implementations have been described in the general context of method steps which may be implemented in one implementation by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of executable instructions or associated data structures represents examples of corresponding acts for implementing the functions described in such steps.

As previously indicated, implementations may be practiced in a networked environment using logical connections to one or more remote computers having processors. Those skilled in the art will appreciate that such network computing environments may encompass many types of computers, including personal computers, hand-held devices, multiprocessor systems, microprocessor-based or programmable consumer electronics, network PCs, minicomputers, mainframe computers, and so on. Implementations may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the implementations might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principles of the disclosure and its practical application to enable one skilled in the art to utilize the various implementations and with various modifications as are suited to the particular use contemplated. Other substitutions, modifications, changes and omissions may be made in the design, operating conditions and arrangement of the implementations without departing from the scope of the present disclosure as expressed in the appended claims.

What is claimed is:

1. A computing system for moving target defense using software-defined networking (SDN) based routing, the system comprising at least one processor and a memory comprising computer-executable instructions, the instructions, when executed by the at least one processor, operable to:
   receive a packet;
   determine a source identifier from the packet; and
   responsive to a determination that the source identifier does not match a pre-defined packet flow rule of an SDN switch:
      transmit at least a first segment of the packet, via the SDN switch, to a decoy controller, the decoy controller structured to manage packet flow rules regarding packet routing to a decoy environment; and
      if at least the first segment of the packet violates a configuration resource rule of the decoy controller, modify a second segment of the packet, comprising operations to replace a destination identifier with a decoy environment identifier;
      route the packet, via the SDN switch, to a resource within the decoy environment wherein the packet is routed to a first port associated with an application impersonation service on a decoy host in the decoy environment;
   generate a decoy response message comprising at least one of a time-out message, a service unavailable message, and a restricted access message; and
   transmit the decoy response message to a computing device associated with the source identifier.

2. The system of claim 1, wherein the configuration resource rule of the decoy controller is a whitelist.

3. The system of claim 2, wherein the configuration resource comprises any of an application-layer information, a link-layer information, and a transport-layer information.

4. The system of claim 3, wherein the application-layer or the link-layer comprises at least one of a VLAN identifier, a destination address, and a destination port.

5. The system of claim 4, wherein the destination address is a partial destination address comprising an IP subnet identifier.

6. The system of claim 4, wherein the destination address is one of an IP address and a MAC address of a decoy host in the decoy environment.

7. The system of claim 1, wherein at least a portion of the first segment of the packet comprises at least a portion of the second segment of the packet.

8. The system of claim 1, wherein the at least the first segment of the packet comprises a copy of content of the packet.

9. The system of claim 8, wherein the first segment of the packet comprises a copy of entire packet.

10. The system of claim 1, the memory further comprising instructions that, when executed by the at least one processor, are operable to:
    cause the packet to be forwarded to a second port associated with an attack analytics application; and
    cause the attack analytics application to generate a visualization based on an evaluation of at least one of payload, metadata, header, and footer of the packet.

11. The system of claim 10, the memory further comprising instructions that, when executed by the at least one processor, are operable to:
    cause the attack analytics application to generate an SDN switch rule recommendation based on an evaluation of at least one of the payload, the metadata, the header, and the footer of the packet.

12. The system of claim 1, wherein the packet is transmitted between the SDN switch and the decoy controller over at least one of an SSL communications channel and a TLS communications channel.

13. The system of claim 1, wherein the SDN switch comprises the decoy controller.

14. The system of claim 1, wherein the resource within the decoy environment is a virtualized resource comprising at least one of a virtual server and a virtual host.

15. A computing system for moving target defense using software-defined networking (SDN) based routing, the system comprising at least one processor and a memory comprising computer-executable instructions, the instructions, when executed by the at least one processor, operable to:
    receive a packet;
    determine a source identifier from the packet; and
    responsive to a determination that the source identifier does not match a pre-defined packet flow rule of an SDN switch:
       transmit at least a first segment of the packet comprising a pointer to a memory location shared by the SDN switch and the decoy controller, via the SDN switch, to a decoy controller, the decoy controller structured to manage packet flow rules regarding packet routing to a decoy environment; and
       if at least the first segment of the packet violates a configuration resource rule of the decoy controller:
          modify a second segment of the packet, comprising operations to replace a destination identifier with a decoy environment identifier; and
          route the packet, via the SDN switch, to a resource within the decoy environment.

16. A computing system for moving target defense using software-defined networking (SDN) based routing, the system comprising at least one processor and a memory comprising computer-executable instructions, the instructions, when executed by the at least one processor, operable to:
  receive a packet;
  determine a source identifier from the packet;
  responsive to a determination that the source identifier does not match a pre-defined packet flow rule of an SDN switch:
    transmit at least a first segment of the packet, via the SDN switch, to a decoy controller, the decoy controller structured to manage packet flow rules regarding packet routing to a decoy environment; and
    if at least the first segment of the packet violates a configuration resource rule of the decoy controller:
      modify a second segment of the packet, comprising operations to replace a destination identifier with a decoy environment identifier; and
      route the packet, via the SDN switch, to a resource within the decoy environment;
  generate a new packet flow rule comprising at least one property of the packet, the new packet flow rule generated in part based on instructions from the configuration resource of the decoy controller; and
  add the new packet flow rule to the SDN switch.

17. The system of claim 16, the memory further comprising instructions that, when executed by the at least one processor, are operable to:
  route the packet to the SDN switch; and
  cause the SDN switch to re-evaluate the packet using the new packet flow rule.

* * * * *